US006954646B2

(12) United States Patent
Churt

(10) Patent No.: US 6,954,646 B2
(45) Date of Patent: Oct. 11, 2005

(54) DATA COMMUNICATION RADIO NETWORK

(75) Inventor: Kerstin Churt, Hersbruck (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 401 days.

(21) Appl. No.: 10/254,223

(22) Filed: Sep. 25, 2002

(65) Prior Publication Data

US 2003/0078030 A1 Apr. 24, 2003

(30) Foreign Application Priority Data

Oct. 19, 2001 (DE) ......................................... 101 52 554

(51) Int. Cl.⁷ ................................................ H04Q 7/20
(52) U.S. Cl. ...................... 455/450; 455/466; 455/517; 455/41.2; 455/507; 340/870.01; 340/870.02; 340/870.11; 705/412; 700/286
(58) Field of Search ................................. 455/450, 466, 455/560, 41.2, 517, 507; 340/870.01, 870.02, 870.11; 705/412; 709/223, 224; 700/286

(56) References Cited

U.S. PATENT DOCUMENTS

| | | | |
|---|---|---|---|
| 5,553,094 A | | 9/1996 | Johnson et al. |
| 5,914,672 A | * | 6/1999 | Glorioso et al. ........ 340/870.02 |
| 6,006,212 A | * | 12/1999 | Schleich et al. ............ 705/412 |
| 6,014,089 A | * | 1/2000 | Tracy et al. ........... 340/870.02 |
| 6,078,785 A | * | 6/2000 | Bush .............................. 455/7 |
| 6,141,565 A | * | 10/2000 | Feuerstein et al. .......... 455/560 |
| 6,195,018 B1 | * | 2/2001 | Ragle et al. ........... 340/870.01 |
| 6,351,223 B1 | * | 2/2002 | DeWeerd et al. ...... 340/870.03 |
| 6,411,219 B1 | * | 6/2002 | Slater .................... 340/870.02 |
| 6,509,841 B1 | * | 1/2003 | Colton et al. .......... 340/870.11 |
| 6,535,797 B1 | * | 3/2003 | Bowles et al. ............... 700/286 |
| 6,684,245 B1 | * | 1/2004 | Shuey et al. ................. 709/223 |
| 6,748,220 B1 | * | 6/2004 | Chow et al. ................ 455/450 |
| 2002/0039380 A1 | * | 4/2002 | Steed et al. ................. 375/132 |

* cited by examiner

Primary Examiner—Stephen D'Agosta
(74) Attorney, Agent, or Firm—Scully, Scott, Murphy & Presser

(57) ABSTRACT

In the wireless telegram communication (28) from data-generating, unidirectionally communicating terminal devices (12) by way of primary radio sections (10) and by way of subsequent bidirectionally operating data collectors (13) of a radio network (11) to a data-documenting master data collector (14), a memory and selection expenditure governed by redundancy as a consequence of multiple connections by way of the primary radio sections (10) is avoided and nonetheless very reliable telegram communication (18) is achieved with simplified data collectors (13) if distribution criteria such as for example reception field strength-dependent quality information (22) is currently detected and stored in data collectors (13) for primary radio sections (10) from terminal devices (12). In dependence on the instantaneous distribution criteria for each terminal device (12) the master data collector (14) implements a quasi-stationary association with one and only one of the data collectors (13) for the subsequent telegram communications (18), until for example periodically or in an event-controlled manner a new association of a terminal device (12) is again implemented with one and only one, possibly a different one of the data collectors (13). The data collectors (13) also operate with each other as relay stations (25) for forwarding the data telegrams (18) to the master data collector (14) and are equipped, to prevent telegram doublets occurring on different routes, with a barrier against the same data telegram (18) being read out a plurality of times.

11 Claims, 1 Drawing Sheet

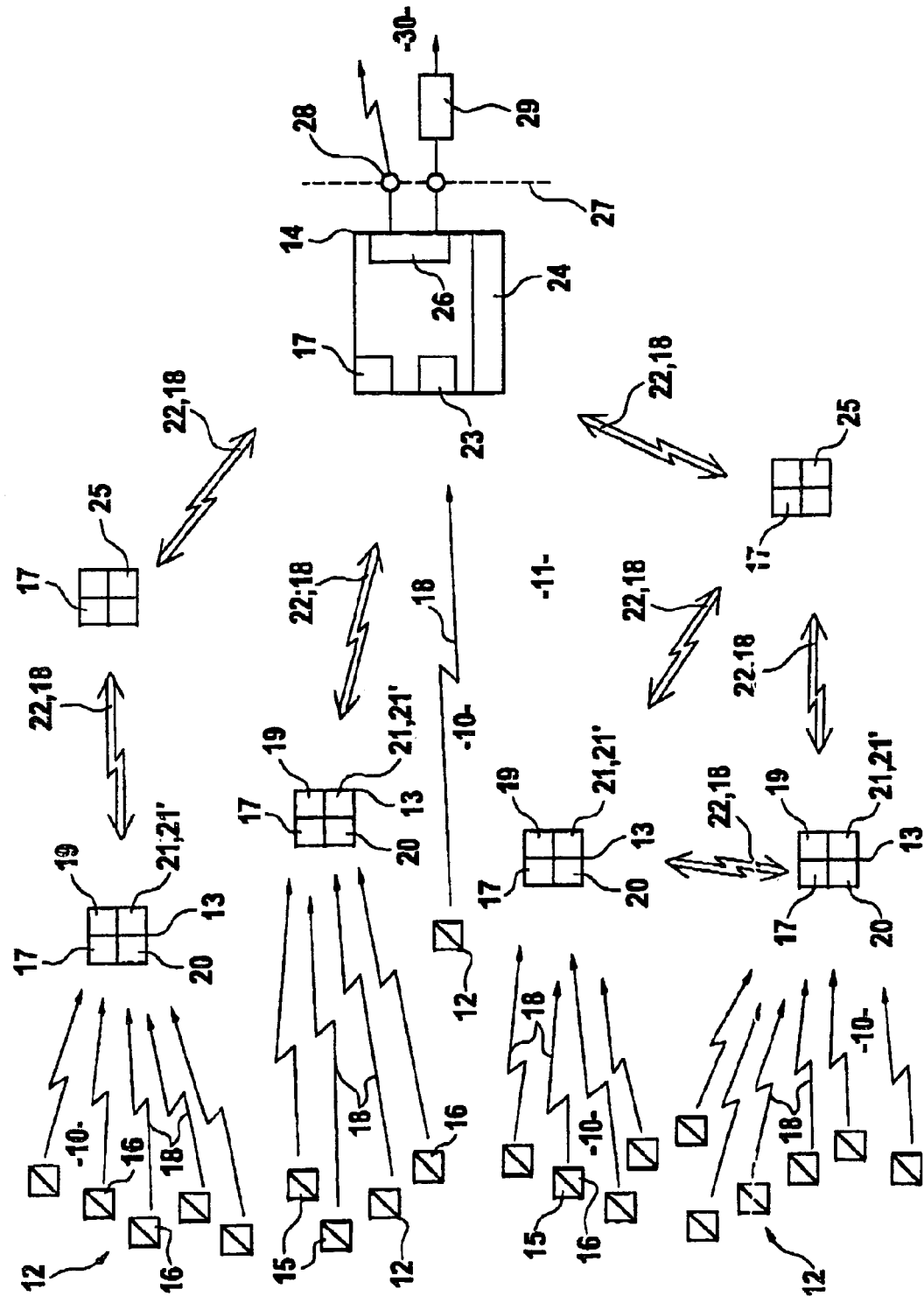

DATA COMMUNICATION RADIO NETWORK

BACKGROUND OF THE INVENTION

1. Field of the Invention

The invention relates to a radio network with bidirectionally operating data collectors which communicate data, telegrams from data-generating terminal devices to a data-documenting master data collector.

2. Discussion of the Prior Art

A radio network of that kind which is described in U.S. Pat. No. 5,553,094 is operated in the United States of America by Itron Inc. in order to be able to collect billing-relevant consumption data from consumers resident distributed over wide areas, collected at a few locations which can be easily reached, for the purposes of consumption billing, without having to call on the consumers in such thinly populated regions individually for the purposes of reading meters. In that system each terminal device which includes the meters is in radio communication in parallel with at least two data collectors for the primary communication of its measurement data telegrams. The reliability of that radio network which operates over a large area is based on that redundancy in the primary radio connections between on the one hand the data-generating terminal devices at the consumers and on the other hand the data collectors for intermediate storage and forwarding of current data telegrams. As a result, the current data of each terminal device are at present complete, being identical in terms of content, in at least two of the data collectors. It will be noted that this involves in particular the need for a considerable amount of storage space in the data collectors and then later, in the course of data processing, a correspondingly high level of additional expenditure and complication for finding the currently valid data, while excluding the doublets which originate from the same terminal device and which, in spite of having the same origin and the same content, by virtue of transmission over different radio paths or because of temporary reception blockages, are only available with a greater or lesser time displacement. A radio network which is designed in such a way makes a significant very adverse difference, in terms of technical expenditure and cost, in particular when a plurality of data terminal devices are operated in relatively closely adjacent relationship, such as for example in a suburban housing estate or indeed in urban apartment blocks.

SUMMARY OF THE INVENTION

In consideration of those factors the invention is based on the technical object of so designing a radio network of the general kind set forth that, in particular with even a relatively large accumulation of terminal devices which are operated in relatively closely adjacent spatial relationship, the network guarantees less expensive but nonetheless very highly flexible and reliable acquisition and forwarding of the data thereof.

In accordance with the invention, that object is attained by the combination of the essential features which is recited in the main claim, whereby such redundancy in the primary data transmissions, that is to say from the terminal devices to the respective first data collectors which follow in the network, is deliberately excluded. Instead, now, in the radio network designed in accordance with the invention, the data collectors are no longer designed as storage devices for the contents of all or at any event many randomly receivable primary terminal device telegrams, irrespective of which paths those primary data follow; on the contrary, the data collectors now firstly receive for example distribution criteria which are derived from the current primary radio connections. Those criteria are interrogated from the data collectors by way of bidirectional radio connections by a master data collector collected downstream thereof, ordered and used as the basis for configuration of the radio network in such a way that given terminal devices—and only those— are associated with given data collectors—and only those— for primary data reception, in order reliably to avoid parallel primary connections from the terminal devices. In that respect the flexibility of the network is still further increased by virtue of the fact that, with locally suitably advantageous radio transmission conditions, the master data collector can also associate given terminal devices directly, without the intermediate connection of other data collectors.

Such a distribution criterion which is to be stored for the respectively given primary radio connection in the data collector can be the respective reception quality of the individual primary radio connections which go back to a respective given terminal device, at the respective operating locations of the data collectors. That reception quality criterion can be defined directly, for example having regard to the interference situation in the primary radio connection, by way of the comparison of a predetermined test telegram with the reception bit pattern thereof; or indirectly for example simply in accordance with the reception field strength. That situation then involves associating with a data collector for example only the terminal devices which are to be received here in the optimum manner, for the intermediate storage of the data telegrams thereof. As thereafter those terminal devices, for the current configuration of the radio network, are no longer associated with any other one of the data collectors, parallel primary connections are excluded.

Another advantageous distribution criterion which can possibly be used as a secondary aspect can be the access volume: if for example there are already very many primary radio connections to a given one of the data collectors, it is blocked for receiving data telegrams from further terminal devices even in a situation involving good reception quality, so that other data collectors must deal with the remaining terminal devices. That permits a desirable limitation of the storage capacity in the data collectors and thereby also reduces energy consumption and therefore prolongs the battery-operated operating period of the data collectors. It can further be provided in accordance with the invention that those ones of the data collectors which finally are associated with only extremely few terminal devices are taken entirely out of operation and those terminal devices are deliberately associated with other data collectors, although in regard thereto the original distribution criterion was not the optimum. Thus, data collectors which are not absolutely necessary for making up the network can be ascertained in the course of network configuration and switched off to save energy or even entirely taken off and dispensed with.

The primary radio connections can be unidirectional in order here to save on the circuitry and operational expenditure and complication for a receiver. If however bidirectional primary connections can be implemented as a result of also equipping the terminal devices with receivers, that affords the advantage that the terminal device can be notified from the first data collector which receives after the primary radio connection, that a useable current data telegram has been received and measurement transmission can be switched off in the terminal device until the expiry of a predetermined period of time or until a fresh data telegram is called up, in order to prolong the battery-fed period of operation of the terminal device.

At any event, distributing the terminal devices to only one respective one of the data collectors ensures that the current data telegram of a terminal device is put into intermediate storage for the first time in only a single one of the data collectors, from the primary radio connections. The other data collectors, for terminal devices which are additionally received there, do not store any primary data telegrams, but only the items of information about the current distribution criteria thereof, in origin-related and time-stamped manner. Even in the case of unintentional sweeping interrogation of the storage devices of all data collectors therefore each data telegram will appear only once because the system prevents redundancy by way of the primary radio connection by means of the distribution criterion.

The distribution criteria, such as for example radio reception quality information, which are stored in the associated data collector in such a way as to be identified (time-stamped) in respect of the terminal device origin thereof and the occurrence thereof in respect of time, are interrogated by the master data collector from the data collectors which are connected upstream thereof in the radio network in order, as mentioned, when first configuring the network and (in time-controlled or event-controlled manner) also later once again, to associate given terminal devices with given data collectors on the basis of the most recently detected quality of primary radio connections—in the case by way of example each terminal device is associated with only the one data collector, in respect of which there is at that time the best radio connection. Thereupon each data collector receives from those terminal devices which are associated only with same the data telegrams which arrive in primary radio mode, so that same—generally with intermediate storage only of the respectively most up-to-date telegram of a terminal device—can be further passed spontaneously or upon inquiry to the master data collector.

Those data telegrams originally describe at any event the current content of the terminal devices; in addition they can communicate further items of information, for example about operational procedures and about the battery charge state in the case of self-sufficient operation of the terminal devices. If, as is preferably provided, the current, forwarded data telegram is put into intermediate storage in the data collector in a specific storage region of the extent of a data telegram, for example for documentation purposes or for the purposes of inquiry from the master data collector, overwriting thereof is effected automatically by the next data telegram received from that terminal device, so that it is only ever the current data telegram that is necessarily communicated to the master data collector.

The other data collectors with which a given terminal device is not associated, although they can receive it, do not accept the data telegrams thereof in respect of content, but only serve for determining and storing the distribution criterion such as in particular the current reception quality of those radio connections. The master data collector implements a different association of the primary radio of terminal devices with a given data collector only when that is triggered in time- or event-controlled mode, for example because the radio connection which is currently established from the terminal device to a given data collector is broken off or at any event became seriously worse. Then the master data collector, for the terminal device affected thereby, calls up the current items of quality information stored in the various data collectors in order—for this example of the distribution criterion—to find the primary radio connection which is currently the best in quality, and to enable same in future for communication of the data telegrams by way of that other data collector. Such reorganisation of the data path at the end of the primary radio connection, which takes place in long cycles, for example monthly, ensures that no long-term errors can creep into the data communication of given terminal devices, whereby the degree of reliability of the system is additionally increased, even without redundancy in the primary radio connections from the terminal devices.

To sum up therefore in the case of the network design in accordance with the invention for wireless telegram communication the data thereof are generated in terminal devices, communicated by way of primary radio sections to first data collectors and thereafter forwarded to a data-documenting master data collector, while however avoiding redundancy as a consequence of multiple connections by way of the primary radio sections and a resulting increase in storage and selection expenditure and complication. In this connection, very reliable data telegram communication is achieved with data collectors of a simplified design, insofar as, for the primary radio sections, prevailing distribution criteria such as for example items of quality information dependent on strength of reception field or levels of occupation intensity are acquired and stored in the data collectors. Then, in dependence on the instantaneous distribution criteria for each terminal device, a quasi-stationary association with one and only one of the data collectors is effected by the master data collector, for the subsequent telegram communications by way of the radio network, until for example in a periodic or event-controlled manner a new association of a terminal device is effected again with one and only one of the data collectors, which one data collector may possibly be a different one. The data collectors operate in bidirectional mode in the network, including between each other, as relay stations, for forwarding the data telegrams to the master data collector. To prevent telegram doublets which then possibly occur on different paths, the data collectors can easily be equipped with a block to prevent the same telegram from being read out a multiple of times.

BRIEF DESCRIPTION OF THE ACCOMPANYING DRAWING

In regard to further advantages and additional modifications and developments of the structure according to the invention, besides the further claims, attention is also directed to the description hereinafter of a preferred embodiment of the radio network designed in accordance with the invention, which is diagrammatically shown not to scale in a highly abstracted form in the drawing, being restricted to what is essential.

The single FIGURE of the drawing shows in the manner of a single-pole block circuit diagram the data transmission of distributedly operated primary radio terminal devices by way of bidirectionally operating data collectors to an also bidirectionally operating master data collector.

DETAILED DESCRIPTION OF PREFERRED EMBODIMENTS

The radio network 11 considered in the context of the present invention extends from a relatively large number of terminal devices 12 (for example in residences in a multiple-unit dwelling) by way of primary radio paths or sections 10 to a plurality of data collectors 13 (for example in various storeys of the stairwell of the housing unit) and by way thereof to typically only one master data collector 14 which also implements central coordinating functions (for example in the central equipment room or at the ground floor entry of the building).

Each terminal device 12 has a data acquisition unit 15 with an identification unit for individualisation thereof and a radio transmission unit 16, which in terms of equipment technology can both be integrated in apparatus terms or which can simply be assembled with each other. The acquisition unit 15 in the terminal device 12 typically involves measuring or recording devices for consumption-dependent quantitative data such as that relating to the consumption of water, power or heat. The transmission unit 16 converts the consumption data produced by the data-generating acquisition unit 15 into digital serial telegrams 18 and emits same by way of its transmitter. That procedure is also referred to as primary radio 10 in the context of the present description of the invention. In the case of an only unidirectional primary radio 10 in accordance with the present embodiment, the terminal devices 12 are not equipped with receivers.

Disposed in relation to a relatively large number of terminal devices 12 is a number of data collectors 13, which is small in comparison therewith. Each data collector 13 is equipped with a transmitting-receiving device 17 for a bidirectional mode of operation. In that way it receives the data telegrams 18 which are generated at the terminal devices 12 in self-sufficient manner, in quasi continuous mode—namely stochastically in a time pattern which typically measures in accordance with minutes—and which are communicated by way of their primary radio sections 10. In the interests of affording a long battery-operated period of operation reception in the data collector 13 is enabled only at relatively great time intervals of typically some hours up to some weeks, by an internal interval-determining device. Then, the data telegrams 18 which are received in the data collector 13 from various terminal devices 12, with identification in respect of origin, are evaluated in regard to the above-discussed distribution criterion, and are in particular assessed for example in a quality-measuring device 19, on the basis of the reception aspects, in respect of the data transmission quality which is afforded at that time on the respective primary radio section 10. The result of that assessment, which is individualised in regard to the association with a given one of the terminal devices 12, is stored, supplemented by a time stamp from a clock 20 in respect of date and clock time, in a memory 21 and overwritten there by more recent quality values (reception qualities 22) which later occur from the same terminal device 12. In that respect therefore the memory 21 only contains the identifications of the terminal devices 12 which are received by that data collector 13, and the present distribution criteria associated with them, as described hereinafter on the basis of reception qualities 22—but not also the contents of the received data telegrams 18.

The data consistency in regard to the data telegram 18 which is just being communicated by way of the primary radio section 10 can be established as the reception quality 22, depending on the respective expenditure to be incurred for the measuring apparatus 19, for example by way of an error checking process. As regard situations in practice however, it is already sufficient to operate a conventional field strength measuring circuit at the respective location of reception, as the quality measuring apparatus 19, and then to associate as the distribution criterion the mean current primary radio reception field strength with the received terminal device 12, in the memory 21.

The master data collector 14 which also operates bidirectionally and which is therefore also equipped with transmitting-receiving devices 17 is designed initially, in particular when the radio network 11 is brought into operation, to prompt the data collectors 13 in quasi-parallel mode or in succession in respect of time, directly or by any indirect routes, for example by way of relay stations 25, to communicate to it their distribution criteria which are stored in association with the received terminal devices 12, like items of quality information 22. As very different quality information 22 may be present in various data collectors 13 in respect of the primary radio sections 10 from the same terminal device 12, those items of information are sorted in the master data collector 14 itself or in an evaluation device connected downstream thereof, by way of comparator 23, in respect of origin and age (that is to say in terms of the identification of the terminal device 12 and the time stamp from the clocks 20 in the data collectors 13 in order to establish for each individual one of the terminal devices 12, in relation to which of the data collectors 13 there is currently the best-quality connection by way of a primary radio section 10 for transmission of its data telegrams 18. Accordingly, a fixed association now occurs from only one respective one of the data collectors 13 with a quite specific one of the terminal devices 12, from the master data collector 14, by way of radio, to the individual data collectors 13. From that time on the data telegrams 18 of a given terminal device 12 can be received in respect of content by that one, solely determined data collector 13, put into intermediate storage, and forwarded when prompted by way of the network 11 to the master data collector 14.

The basic technical implementation of the master data collector 14 is that of the data collectors 13. Therefore, as is taken into consideration in the middle of the drawing, when suitable transmission conditions prevail, the master data collector 14 can also receive data telegrams 18 by way of primary radio sections 10 directly, without going by way of interposed data collectors (13), from terminal devices 12 which it has not associated with other data collectors (13) but directly with itself. That is of practical interest in particular if the master data collector is not operated at a remote location but for example in a residential unit amongst the installation of the terminal devices 12, so that additional data collectors 13 are to be interconnected only for particularly disadvantageous transmission paths in the network 11.

In the respective data collector 13 time-stamped intermediate storage only of the respective data telegram 18 currently received from the associated terminal device 12, in a particular storage region 21' which is allocated just to the length thereof, is to be preferred, with overwriting of the previous memory content therein, from the same terminal device 12. The small memory extent which is adapted to the telegram 18 of a terminal device 12 affords the advantages that no data selection has to be implemented in the data collector 13 because, from each associated terminal device 12, only the most up-to-date data telegram 18 is stored, it is inexpensive in terms of apparatus, and it can be operated with a low energy demand. Without having to packet the current data telegram 18 for forwarding with other telegrams 18 of this or another terminal device 12, this comparatively short data telegram 18 which is currently in intermediate storage here with its time stamp can be read out at any time for processing and also forwarded in unsynchronised manner, precisely because of the unpacketed short data telegrams 18, over any routes, through a time slice-synchronised radio network 11 which would not be operable with packeted and therefore long telegrams. This implements data communication which is not fixedly established but flexible and which therefore can also be adapted in a self-learning mode to the current conditions.

Intermediate storage only of the respective current data telegram 18 of a terminal device 12 in only the one data collector 13 associated therewith at the end of the primary radio section 10 also affords in particular the possibility of having the master data collector 14 freely decide when the data telegram 18, which is always applicable, from a given terminal device 12, is acceptable to the master data collector; that is to say, not to sweepingly call up communication to data processing in the master data collector 14 and not to have it determined by the data collector 13, but to call it up from the master data collector 14 by way of the bidirectional radio connection through the network 11 when it is precisely the telegram 18 of a given terminal device 12 that is required there for further processing or evaluation. Instead of that however, it is also possible, preferably stochastically in one of the known time slot processes, for a non-determined prompt to be issued from the master data collector 14 to all data collectors 13 for all their currently present data telegrams 18 to be serially communicated in a short time. For the master data collector 14, at any event, it is now generally no longer the respective terminal device 12 but the data collector 13 which is currently solely associated therewith that acts as the data source which is there only once in that radio network 11 for each terminal device 12.

Additional items of information, for example relating to the operating technology, can also be sent to the master data collector 14 from the respective data collector 13, in a header or attachment to the data telegram 18 from the primary radio section 10, for example relating to the battery capacity which is still available, in the case of data collectors 13 which operate in a self-sufficient manner.

Besides switching through telegrams, the distribution criterion such as in particular the quality 22 of the current connection by way of the primary radio section 10 is still continuously established in the data collector 13, and stored in time-dependent fashion in association with the respective terminal device 12. The other data collectors 13 which also receive the telegrams 18 from that terminal device 12, although they are not associated therewith, do not receive the data telegrams 18 thereof in respect of content, but only for ascertaining, storing and keeping in readiness the current quality information 22. That ensures that these other data collectors 13, even in response to an unspecified call-up on the part of the master data collector 14, cannot communicate any primary terminal device data in addition to the solely authorised first data collector 13 by way of the radio network 11. Nonetheless all implementable primary radio sections 10 to all data collectors 13 are known at any time in regard to their distribution criteria in order to be able to provide for reconfiguring the network 11 at any time on the basis of the previous criteria.

The association of a plurality of terminal devices 12 with one and only a respective one of the data collectors 13, which is predetermined by way of the comparator 23 by the master data collector 14, is therefore maintained for each terminal device 12 until it is executed again in time-controlled, randomly controlled or event-controlled fashion, for example until there is in the master data collector 14 a reason for the data collectors 13, in respect of a given terminal device 12, to be called up again for the communication of current distribution criteria such as items of quality information 22. That can be because faults have appeared in the data telegrams 18 from that terminal device 12, or that the power supply for one of the data collectors 13 is running out and transmission of the data telegrams 18, which hitherto was implemented by way thereof, is therefore in future to be diverted by way of other ones of the data collectors 13 which are available for that purpose in terms of useable primary radio connections 10.

The middle of the drawing in the upper part thereof takes account of the fact that, to overcome problematical radio sections, it may be appropriate for also bidirectionally operating relay stations 25 to be operatively disposed specifically between the data collectors 13 and the master data collector 14 of the radio network 11. These transmit requests from the master data collector 14 and communicate data telegrams 18 sent by data collectors 13 which have just been involved, in randomly governed mode (or items of quality information 22 or the like distribution criteria), to the master data collector 14, so that those relay stations 25 do not necessarily also need memory for intermediate storage of and holding items of information to be communicated. As however each relay station 25 is moreover in any case, like the data collectors 13, equipped with a transmitting-receiving device 17, the latter can also directly execute a relay function (see the bottom of the drawing), insofar as the communication is effected from a data collector 13 to the master data collector 14 by way of at least any other, more desirably disposed one of the data collectors 13, if for example the direct connection is prevented from the radio point of view, as a consequence of screening. As therefore following the primary radio connection 10 data communication can be effected by way of the network 11 from a data collector 13 to the master data collector 14 in randomly governed fashion along different paths in parallel and/or serial relationship by way of a plurality of other data collectors 13, it is in itself not impossible that the master data collector 14 receives the currently applicable data telegram 18 from one of the terminal devices 12 a plurality of times in time-displaced relationship. In order to avoid the complicated and expensive operation of sorting out such doublets in the master data collector 14, the data collectors 13 are desirably adapted to provide that the repeated data telegram 18 which is the newest according to the time stamp and which is associated with a given terminal device 12 is not read out of its data memory 21' a second time, so that the doublets usually disappear again on their own, as they pass through the network 11, in the course of being transmitted between data collectors 13.

The master data collector 14 is preferably provided with an internal or external data processing device 26 which effects at least provisional preparation of the data telegrams 18 which are held ready in the central memory 24, for example for checking in respect of plausibility or for compression purposes and then outputs same by way of an interface 27, for example by way of a wireless (high-frequency or optoelectronic) coupling 28 or by way of a wired modem 29 to a transportable or stationary evaluation apparatus for example for consumption billing and bill generation.

What is claimed is:

1. A data communication radio network (11) with bidirectionally operating data collectors (13) which communicate data telegrams (18) from data-generating terminal devices (12) to a data-documenting master data collector (14), characterized in that the data collectors (13) determine distribution criteria in respect of the respective primary radio section (10) between a terminal device (12) and a first data collector (13) in the network (11) and communicate the distribution criteria to the master data collector (14), on the basis of the communication of the distribution criteria to the master data collector, an association of the transmission of an original data telegram (18) from a terminal device (12) by way of its primary radio section (10) is effected singularly with one and only one of the data collectors (13), other terminal devices (12) can also be singularly associated with the one and only one of the data collectors (13), the one and only one of the data collectors also receives distribution criteria belonging to other terminal devices (12) not associated with it and makes same available to the master data collector (14) and wherein the association of the terminal devices (12) with given data collectors (13), once effected in dependence on the distribution criteria, is maintained until a new association is effected on the basis of current distribution criteria, in time-controlled or random-controlled fashion or on the basis of events in the network (11).

2. A radio network according to claim 1, characterised in that the reliability of data transmission by way of the primary radio section (10) from a terminal device (12) to data collectors (13) is a distribution criterion in the respective data collector (13).

3. A radio network according to claim 1, characterised in that the quality of reception by way of the respective unidirectional primary radio section (10) from a terminal device (12) to the data collectors (13) is a distribution criterion in the respective data collector (13).

4. A radio network according to claim 1, characterised in that a level of occupation intensity of data collectors (13) with primary radio sections (10) is a distribution criterion.

5. A radio network according to claim 1, characterised in that the data collectors (13) are equipped with memories (21) and clocks (20) for the time association of the distribution criteria currently associated with the terminal devices (12).

6. A radio network according to claim 1, characterised in that the data collectors (13) are equipped with a time-stamped memory region (21') of the volume of a data telegram (18) per associated terminal device (12).

7. A radio network according to claim 1, characterised in that the data collectors (13) are equipped with a barrier against repeated reading-out of the same intermediate-stored data telegram (18).

8. A radio network according to claim 1, characterised in that provided in the master data collector (14) is a comparator (23) for the distribution criteria communicated by the data collectors (13) and for singular association of the terminal devices (12) with data collectors (13) which are determined in dependence on the distribution criteria.

9. A radio network according to claim 1, characterised in that relay stations (25) are provided between the data collectors (13) and the master data collector (14).

10. A radio network according to claim 9, characterised in that the relay stations (25) are also data collectors (13).

11. A radio network according to claim 1, characterised in that the master data collector (14) is equipped with a data processing device (25) and an interface (27) to an evaluation apparatus (30).

* * * * *